(12) United States Patent
Tsai et al.

(10) Patent No.: US 12,536,975 B2
(45) Date of Patent: Jan. 27, 2026

(54) DISPLAY PARAMETER ADJUSTMENT METHOD AND DISPLAY PARAMETER ADJUSTMENT SYSTEM CAPABLE OF ADJUSTING DUAL SCREENS INTUITIVELY

(71) Applicant: BENQ CORPORATION, Taipei (TW)

(72) Inventors: Li-Ting Tsai, Taipei (TW); Wen-Ting Liu, Taipei (TW); Yi-Ho Bai, Taoyuan (TW); Yi-Han Huang, Taipei (TW)

(73) Assignees: BenQ Intelligent Technology (Shanghai) CO., LTD, Shanghai (CN); BenQ Corporation, Taipei (TW)

( * ) Notice: Subject to any disclaimer, the term of this patent is extended or adjusted under 35 U.S.C. 154(b) by 255 days.

(21) Appl. No.: 18/367,450

(22) Filed: Sep. 12, 2023

(65) Prior Publication Data

US 2024/0242689 A1    Jul. 18, 2024

(30) Foreign Application Priority Data

Jan. 16, 2023  (TW) ................................ 112101681

(51) Int. Cl.
*G09G 5/00* (2006.01)
*G06F 3/04845* (2022.01)
*G06F 3/04847* (2022.01)
*G06F 3/14* (2006.01)

(52) U.S. Cl.
CPC ......... *G09G 5/003* (2013.01); *G06F 3/04845* (2013.01); *G06F 3/04847* (2013.01); *G06F 3/1431* (2013.01); *G09G 2320/08* (2013.01)

(58) Field of Classification Search
CPC ...... G09G 5/003; G09G 2320/08; G09G 5/02; G06F 3/04845; G06F 3/04847; G06F 3/1431; G06F 3/1423
See application file for complete search history.

(56) References Cited

U.S. PATENT DOCUMENTS

| | | | | |
|---|---|---|---|---|
| 5,499,040 | A * | 3/1996 | Mclaughlin | G06F 3/04842 348/E17.005 |
| 5,638,117 | A * | 6/1997 | Engeldrum | H04N 17/04 348/E17.005 |
| 11,620,099 | B1* | 4/2023 | Gerhardt | G01J 3/506 345/690 |
| 2013/0222412 | A1* | 8/2013 | Pertierra | G01J 3/506 345/593 |
| 2014/0176594 | A1* | 6/2014 | Yang | G09G 3/006 345/590 |
| 2020/0388243 | A1* | 12/2020 | Huang | G09G 5/10 |

* cited by examiner

*Primary Examiner* — William A Beutel

(57) ABSTRACT

A display parameter adjustment method includes providing a first display and a second display, setting the first display as a reference display and setting the second display as an adjustment display, detecting models of the first display and the second display for generating an initial configuration environment of the second display, displaying a reference image on the first display and displaying an adjustment image on the second display according to the initial configuration environment, displaying an adjustment interface on the second display, adjusting a plurality of parameters of the second display by using the adjustment interface to make the adjustment image be consistent with the reference image, and modifying configurations of the second display according to a plurality of adjusted parameters to make screen colors of the second display be consistent with screen colors of the first display.

19 Claims, 11 Drawing Sheets

DISPLAY PARAMETER ADJUSTMENT METHOD AND DISPLAY PARAMETER ADJUSTMENT SYSTEM CAPABLE OF ADJUSTING DUAL SCREENS INTUITIVELY

BACKGROUND OF THE INVENTION

1. Field of the Invention

The present invention discloses a display parameter adjustment method and a display parameter adjustment system, and more particularly, a display parameter adjustment method and a display parameter adjustment system capable of adjusting dual screens intuitively.

2. Description of the Prior Art

With the rapid development of science and technology, displays with various brands and functions are also popularly adopted in our daily life.

Configuration methods and color adjustment modes of displays of different brands are different. For example, some displays use an on-screen display (OSD) mode for adjusting display parameters. Alternatively, some displays can use a remote controller for adjusting display parameters directly. When playing video games or performing other job duties, two or more displays can be used for splicing images or independently displaying different images at the same time. However, Due to manufacturing differences of displays with different brands and functions, different displays may exhibit different color tones.

Therefore, it is important to design a color tone system for optimizing color consistency when at least two displays are configured to display images at the same time.

SUMMARY OF THE INVENTION

In an embodiment of the present invention, a display parameter adjustment method is disclosed. The display parameter adjustment method comprises providing a first display and a second display, setting the first display as a reference display and setting the second display as an adjustment display, detecting models of the first display and the second display for generating an initial configuration environment of the second display, displaying a reference image on the first display and displaying an adjustment image on the second display according to the initial configuration environment, displaying an adjustment interface on the second display, adjusting a plurality of parameters of the second display by using the adjustment interface to make the adjustment image be consistent with the reference image, and modifying configurations of the second display according to a plurality of adjusted parameters to make screen colors of the second display be consistent with screen colors of the first display.

In another embodiment of the present invention, a display parameter adjustment system is disclosed. The display parameter adjustment system comprises a first display configured to display a reference image, a second display configured to display an adjustment image, and a processor coupled to the first display and the second display and configured to control the first display and the second display. The processor sets the first display as a reference display and sets the second display as an adjustment display. The processor detects models of the first display and the second display for generating an initial configuration environment of the second display. The processor controls the first display for displaying a reference image and controls the second display for displaying an adjustment image according to the initial configuration environment. The processor controls the second display for displaying an adjustment interface. The processor adjusts a plurality of parameters of the second display by using the adjustment interface to make the adjustment image be consistent with the reference image. The processor modifies configurations of the second display according to a plurality of adjusted parameters to make screen colors of the second display be consistent with screen colors of the first display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
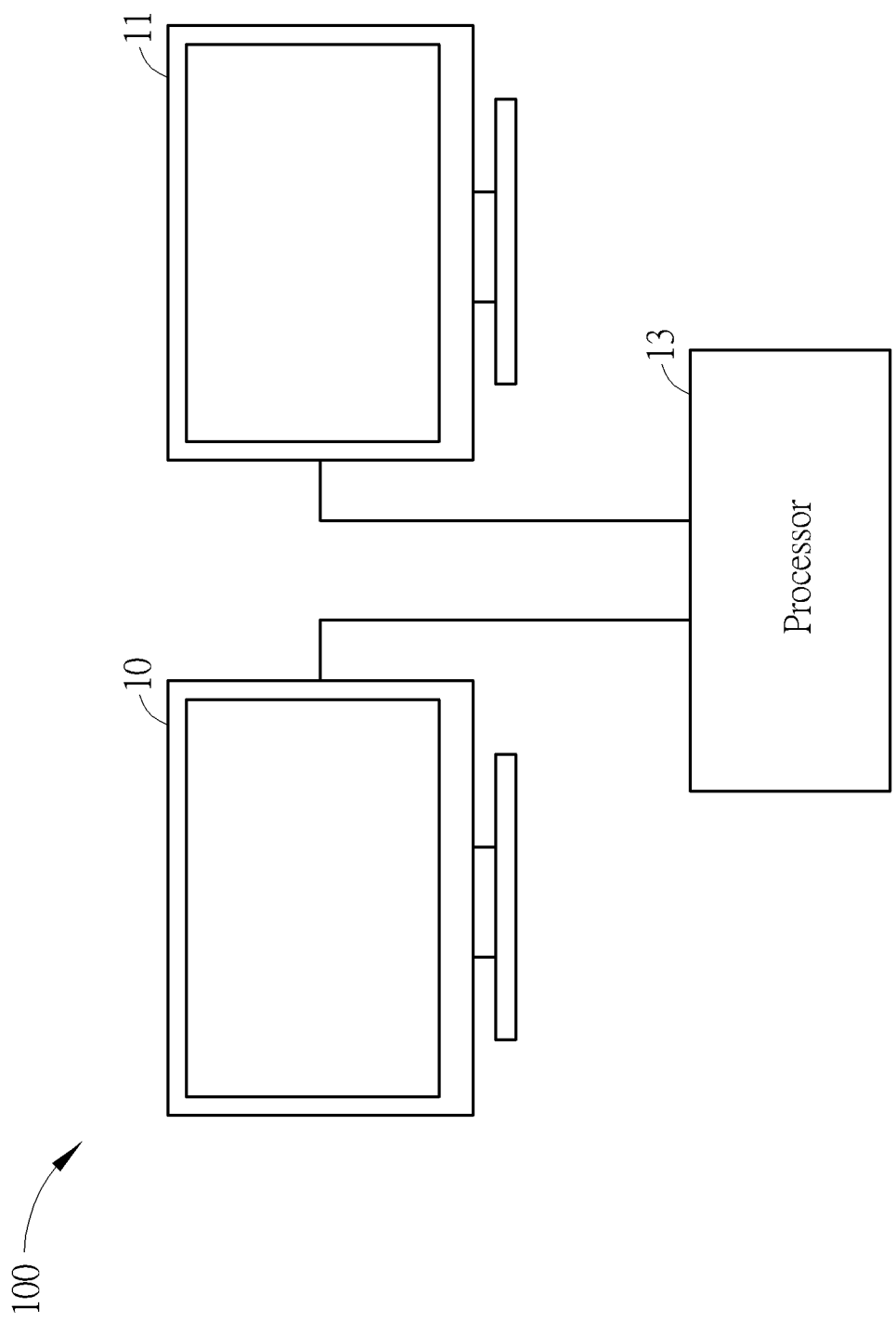
FIG. 1 is a block diagram of a display parameter adjustment system according to an embodiment of the present invention.

FIG. 1 is a block diagram of a display parameter adjustment system 100 according to an embodiment of the present invention. The display parameter adjustment system 100 can be applied to dual screen applications or multi-screen applications. For example, the display parameter adjustment system 100 can be used for splicing images or independently displaying at least two different images on two screens at the same time. Therefore, the display parameter adjustment system 100 can provide various operations for e-sports players or image designers. The display parameter adjustment system 100 can include a first display 10, a second display 11, and a processor 13. The first display 10 is used for displaying a reference image (i.e., the reference image 10a shown in FIG. 2). The second display 11 is used for displaying an adjustment image (i.e., the adjustment image 11a shown in FIG. 2). The processor 13 is coupled to the first display 10 and the second display 11 for controlling the first display 10 and the second display 11. In the display parameter adjustment system 100, the first display 10 and the second display 11 can be coupled to the processor 13 by using cable lines. The first display 10 and the second display 11 can be two different models or different brands of displays. Therefore, their operation modes may be different. The processor 13 can be any processor capable of executing software functions, such as a personal computer or a workstation. A goal of the display parameter adjustment system 100 is to provide an intuitive image adjustment operation for adjusting images displayed on at least two displays. Specifically, after the image adjustment operation is completed, color tones of all displayed images are consistent. In the display parameter adjustment system 100, the processor 13 can set the first display 10 as a reference display and set the second display 11 as an adjustment display. Then, the processor 13 can detect models of the first display 10 and the second display 11 for generating an initial configuration environment of the second display 11. Then, the processor 13 controls the first display 10 for displaying a reference image 10a and controls the second display 11 for displaying an adjustment image 11a according to the initial configuration environment. The processor 13 can control the second display 11 for displaying an adjustment interface (i.e., the adjustment interface 11b shown in FIG. 2). The processor 13 can adjust a plurality of parameters of the second display 11 by using the adjustment interface 11b to make the adjustment image 11a be consistent with the reference image 10a. Further, when resolutions of the adjustment image 11a and the reference image 10a displayed on two screens are different, image resolutions can be automatically scaled to a predetermined resolution. Further, positions of the adjustment image 11a and the reference image 10a can be adjusted according to user requirements. For example, in FIG. 2, the positions of the adjustment image 11a and the reference image 10a can be adjusted to be close to an edge of the display. Therefore, the adjustment image 11a and the reference image 10a can be easily compared. Then, the processor 13 can modify configurations of the second display 11 according to a plurality of adjusted parameters to make screen colors of the second display 11 be consistent with screen colors of the first display 10. Details of adjusting dual displays by the display parameter adjustment system 100 are illustrated later.

Figure 2:
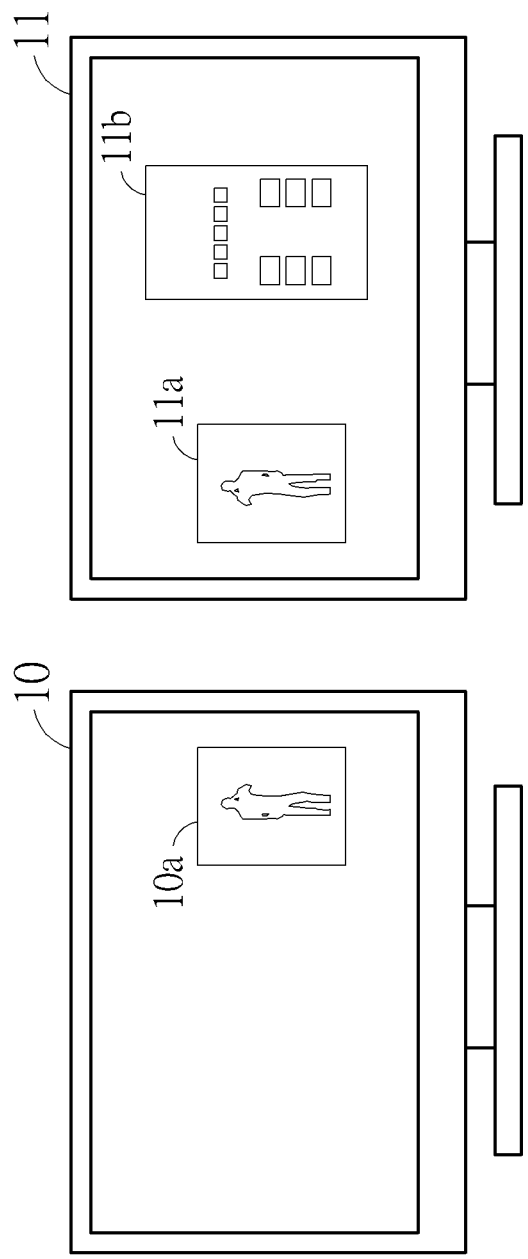
FIG. 2 is an illustration of displaying a reference image, an adjustment image, and an adjustment interface of the display parameter adjustment system in FIG. 1.

FIG. 2 is an illustration of displaying the reference image 10a, the adjustment image 11a, and the adjustment interface 11b of the display parameter adjustment system 100. As mentioned previously, the processor 13 of the display parameter adjustment system 100 can execute and install software programs. The software programs can execute a color adjustment process. In other words, the display parameter adjustment system 100 can adjust color tones of the displays without introducing additional hardware component. In the display parameter adjustment system 100, major parameters of adjusting screen colors can include "brightness", "color temperature", "hue", and "saturation" parameters of the image. Therefore, in the display parameter adjustment system 100, steps for adjusting the screen colors include adjusting white points first, and then adjusting color tones. First, the display parameter adjustment system 100 can bind the first display 10 and the second display 11. The first display 10 and the second display 11 can be two displays having different brands or models. After the display parameter adjustment system 100 binds the first display 10 and the second display 11, it is assumed that the first display 10 is set as the reference display and the second display 11 is set as the adjustment display. The parameter adjustment system 100 can generate the initial configuration environment of the display 10 and the second display 11. For example, the parameter adjustment system 100 can generate the initial configuration environment including model information and color mode information. After a binding status of the first display 10 and the second display 11 is determined, the parameter adjustment system 100 can display the reference image 10a on the first display 10 and display the adjustment image 11a on the second display 11 according to the initial configuration environment. The adjustment interface 11b is also displayed on the second display 11. In one embodiment, when the models of the first display 10 and the second display 11 are identical, the parameter adjustment system 100 can generate the initial configuration environment of the second display 11 by setting a color mode of the second display 11 as a user-defined mode and setting a plurality of color tone parameters of the second display 11 according to configurations of the first display 10. In another embodiment, when the models of the first display 10 and the second display 11 are different, the parameter adjustment system 100 can generate the initial configuration environment of the second display 11 by setting the color mode of the second display 11 as the user-defined mode, setting a part of color tone parameters of the second display 11 according to configurations of the first display 10, and optimizing another part of color tone parameters of the second display 11 within an adjustable range according to configurations of the first display 10. Here, the reference image 10a and the adjustment image 11a can be generated by color blocks. The reference image 10a and the adjustment image 11a can be displayed as two mirror images. However, the parameter adjustment system 100 is not limited thereto. For example, in other embodiments, the reference image 10a and the adjustment image 11a can be two non-mirror images.

Figure 3:
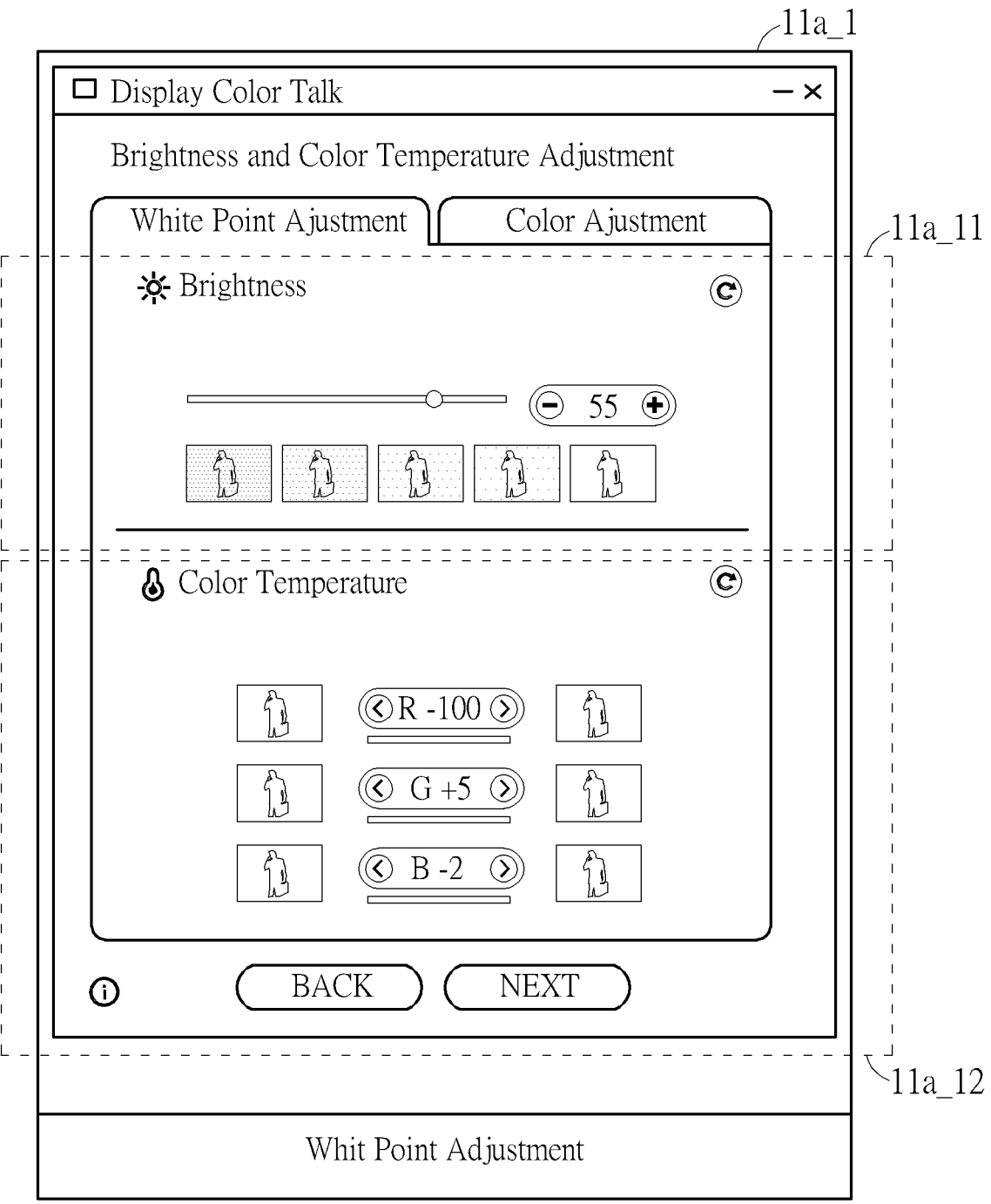
FIG. 3 is an illustration of displaying a white point adjustment interface of the display parameter adjustment system in FIG. 1.
Figure 4:
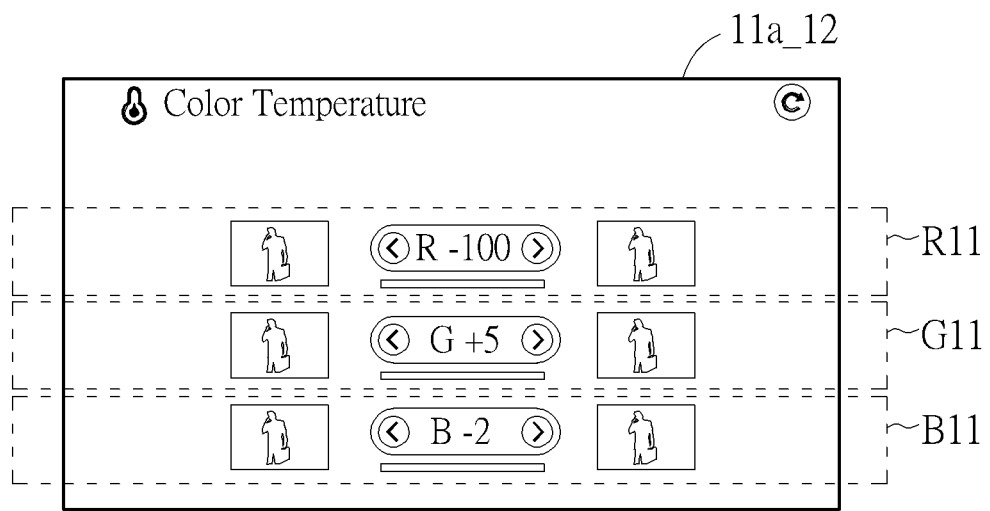
FIG. 4 is an illustration of displaying a color temperature adjustment area of the display parameter adjustment system in FIG. 1.

FIG. 3 is an illustration of displaying a white point adjustment interface 11a_1 of the display parameter adjustment system 100. FIG. 4 is an illustration of displaying a color temperature adjustment area 11a_12 of the display parameter adjustment system 100. As previously mentioned, in the display parameter adjustment system 100, major parameters of adjusting screen colors can include "brightness", "color temperature", "hue", and "saturation" parameters of the image. Therefore, the white points are adjusted first. After the white points are adjusted, the color tones are adjusted. Here, the display parameter adjustment system 100 can perform a white point adjustment program to make brightness and color temperatures of the adjusted image 11a be consistent with the reference image 10a. For example, the display parameter adjustment system 100 can generate the white point adjustment interface 11a_1. As shown in FIG. 3, the white point adjustment interface 11a_1 can include a brightness adjustment area 11a_11 and a color temperature adjustment area 11a_12. The brightness adjustment area 11a_11 can set and adjust the brightness of the adjusted image 11a by dragging a visual adjustment interface or directly inputting brightness levels. Further, as shown in FIG. 4, the color temperature adjustment area 11a_12 can include a red color temperature (gain) adjustment area R11, a green color temperature (gain) adjustment area G11, and a blue color temperature (gain) adjustment area B11. Therefore, the color temperature adjustment area 11a_12 can be used for setting and adjusting ratios of the red color, the blue color, and the green color of the adjustment image 11a. Similarly, in the color temperature adjustment area 11a_12, the color temperatures of the adjusted image 11a can be set by dragging the visual adjustment interface or directly inputting brightness levels. Any reasonable technology for adjusting the brightness and the color temperatures of the adjusted image 11a falls into the scope of the present invention.

Figure 5:
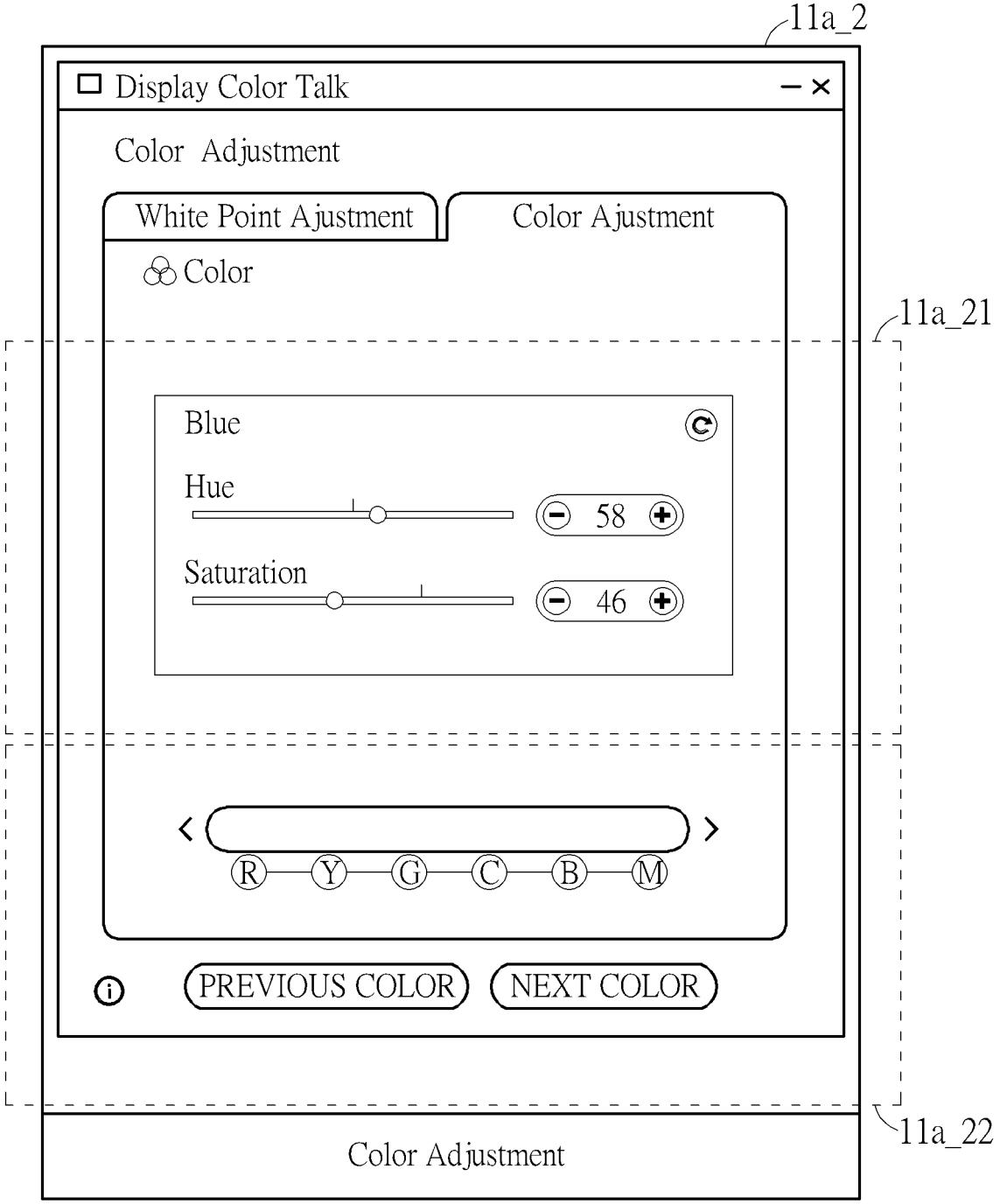
FIG. 5 is an illustration of displaying a color adjustment interface of the display parameter adjustment system in FIG. 1.

FIG. 5 is an illustration of displaying a color adjustment interface 11a_2 of the display parameter adjustment system 100. As previously mentioned, in the display parameter adjustment system 100, major parameters of adjusting screen colors can include "brightness", "color temperature", "hue", and "saturation" parameters of the image. Therefore, the white points are adjusted first. After the white points are adjusted, the color tones are adjusted. In other words, FIG. 3 and FIG. 4 illustrate how to adjust the white points. Then, the display parameter adjustment system 100 can perform a color adjustment program to make a hue value and a saturation value of the adjustment image 11a be consistent with the reference image 10a. For example, the display parameter adjustment system 100 can generate the color adjustment interface 11a_2. As shown in FIG. 5, the color adjustment interface 11a_2 can include a hue and saturation adjustment area 11a_21 and a color wheel configuration area 11a_22. The hue and saturation adjustment area 11a_21 can simultaneously set a hue value and a saturation value of the adjusted image 11a. Similarly, in the hue and saturation adjustment area 11a_21, the hue and saturation of the adjusted image 11a can be set by dragging the visual adjustment interface or directly inputting hue and saturation values. Further, the color wheel includes a red color, a yellow color, a green color, a cyan color, a blue color, and a purple color. Therefore, the wheel configuration area 11a_22 can be used for calibrating the hue and saturation of the adjustment image 11a.

Figure 6A:
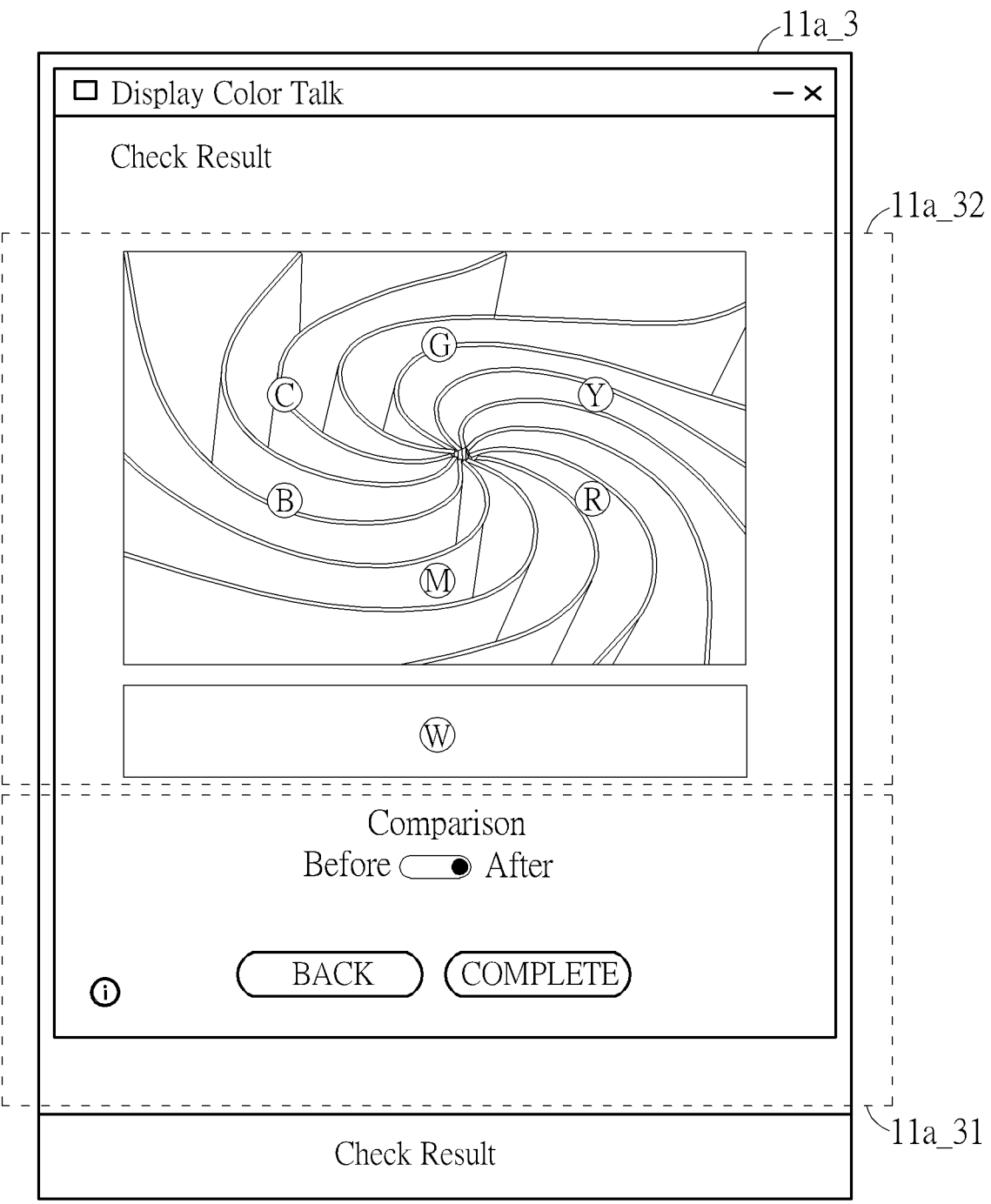
FIG. 6A is an illustration of displaying an adjustment result determination interface of the display parameter adjustment system in FIG. 1.
Figure 6B:
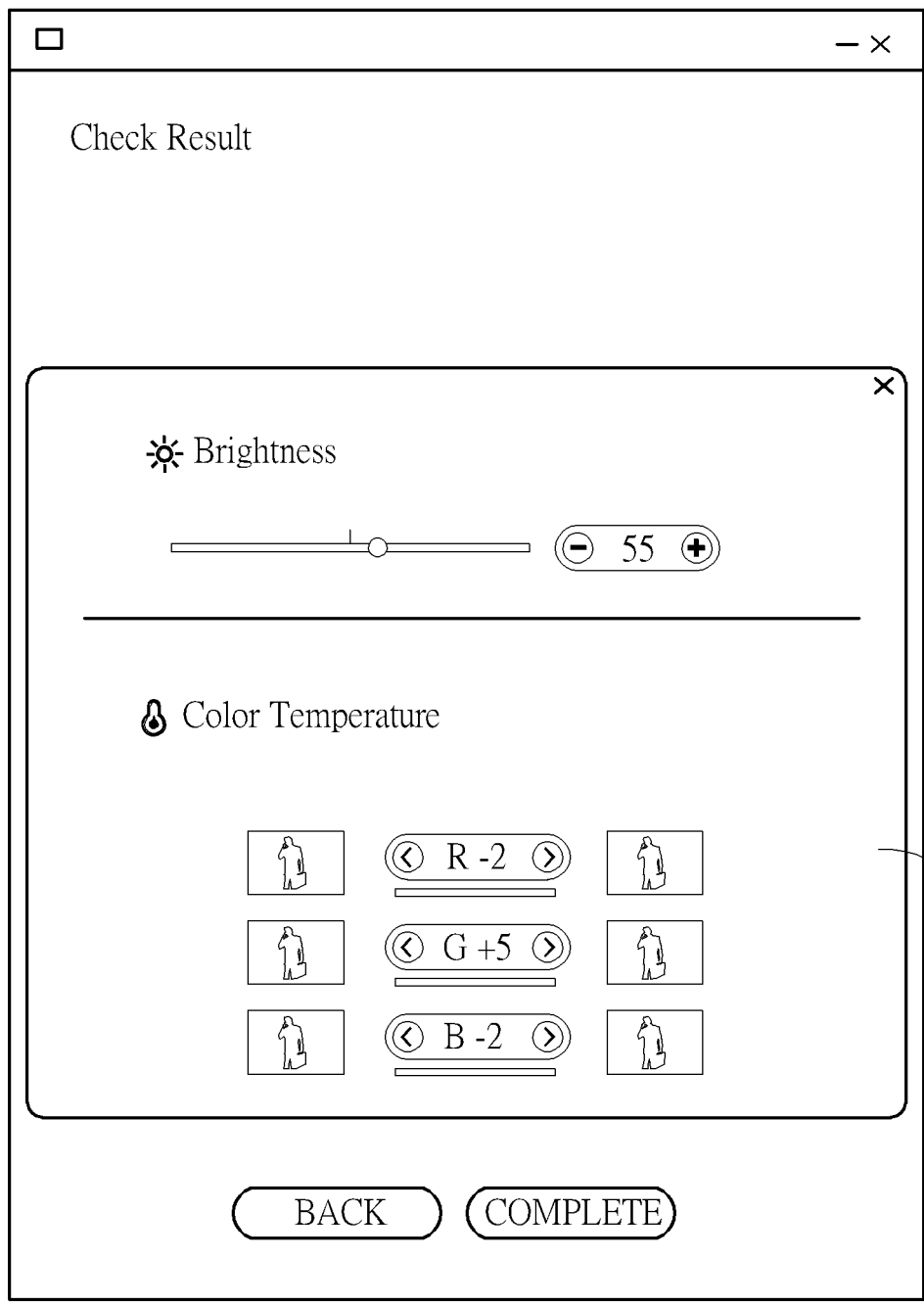
FIG. 6B is an illustration of a first popup quick adjustment window of the adjustment result determination interface of the display parameter adjustment system in FIG. 1.
Figure 6C:
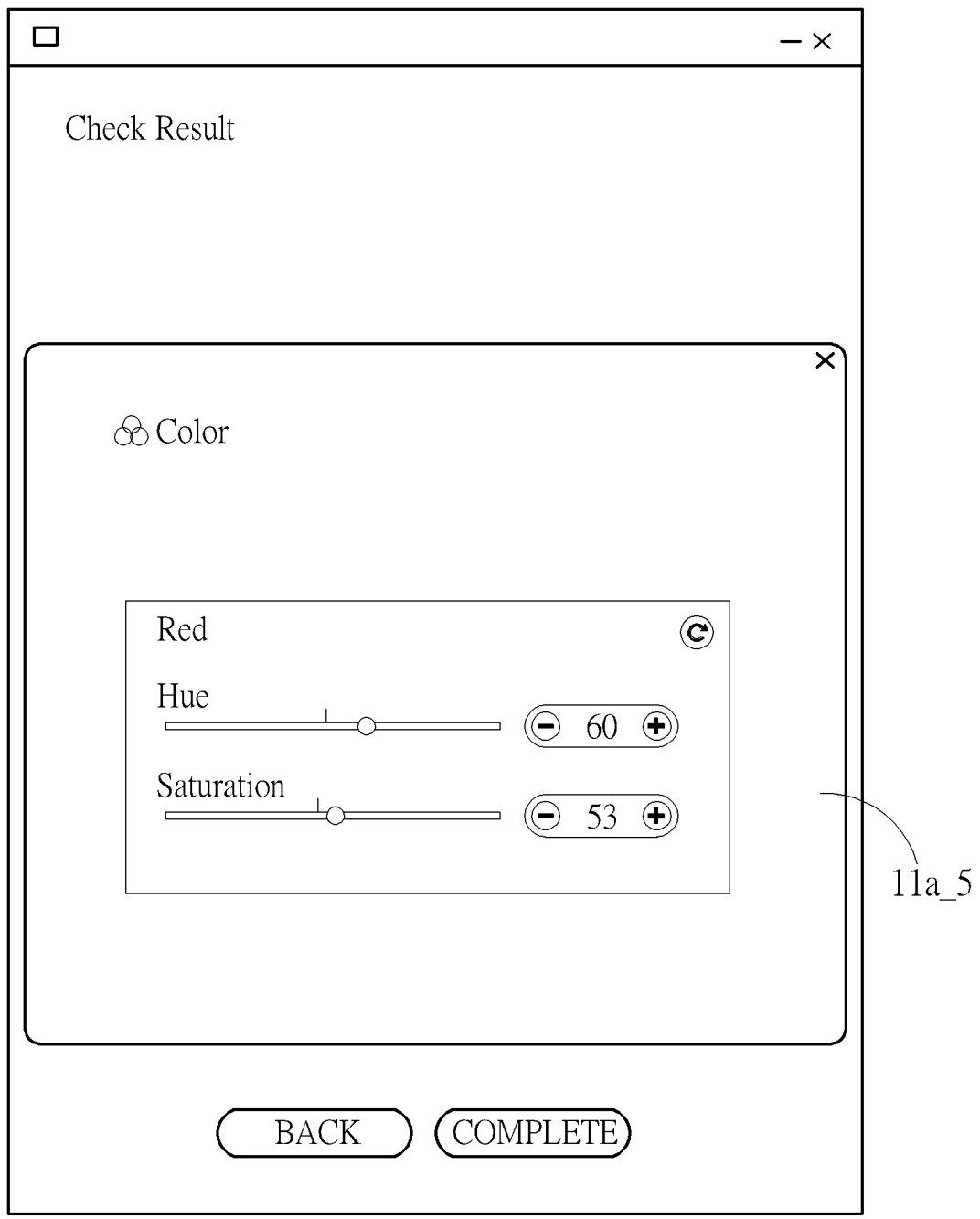
FIG. 6C is an illustration of a second popup quick adjustment window of the adjustment result determination interface of the display parameter adjustment system in FIG. 1.

FIG. 6A is an illustration of displaying an adjustment result determination interface 11a_3 of the display parameter adjustment system 100. FIG. 6B is an illustration of a first popup quick adjustment window 11a_4 of the adjustment result determination interface of the display parameter adjustment system 100. FIG. 6C is an illustration of a second popup quick adjustment window 11a_5 of the adjustment result determination interface of the display parameter adjustment system 100. After the white point adjustment program and the color adjustment program are completed, the display parameter adjustment system 100 can perform an adjustment result determination program for comparing color differences between the adjustment image 11a and the reference image 10a. For example, the adjustment result determination interface 11a_3 can include a shortcut color control interface 11a_32 and a comparison option 11a_31. The shortcut color control interface 11a_32 can also include colors of the color wheel, such as the red color, the yellow color, the green color, the cyan color, the blue color, and the purple color. The shortcut color control interface 11a_32 can also be used for adjusting the white points (i.e., such as the brightness). Therefore, the shortcut color control interface 11a_32 can be used for adjusting the adjustment image 11a. Here, the first popup quick adjustment window 11a_4 (as shown in FIG. 6B) and the second popup quick adjustment window 11a_5 (as shown in FIG. 6C) are displayed for performing final adjustments of the adjustment image 11a. Further, the shortcut color control interface 11a_32 can include the comparison option 11a_31. The comparison option 11a_31 can include a control key for comparing color tones of a current image and a previous image. Thus, the adjustment result determination interface 11a_3 can use an intuitive adjustment operation for performing final adjustments and confirmations of the adjustment image 11a. In the display parameter adjustment system 100, after the white point adjustment program, color adjustment program, and the adjustment result determination program are completed, color tones of the adjustment image 11a are consistent with color tones of the reference image 10a. Therefore, screen colors of the second display 11 are consistent with screen colors of the first display 10.

Figure 7A:
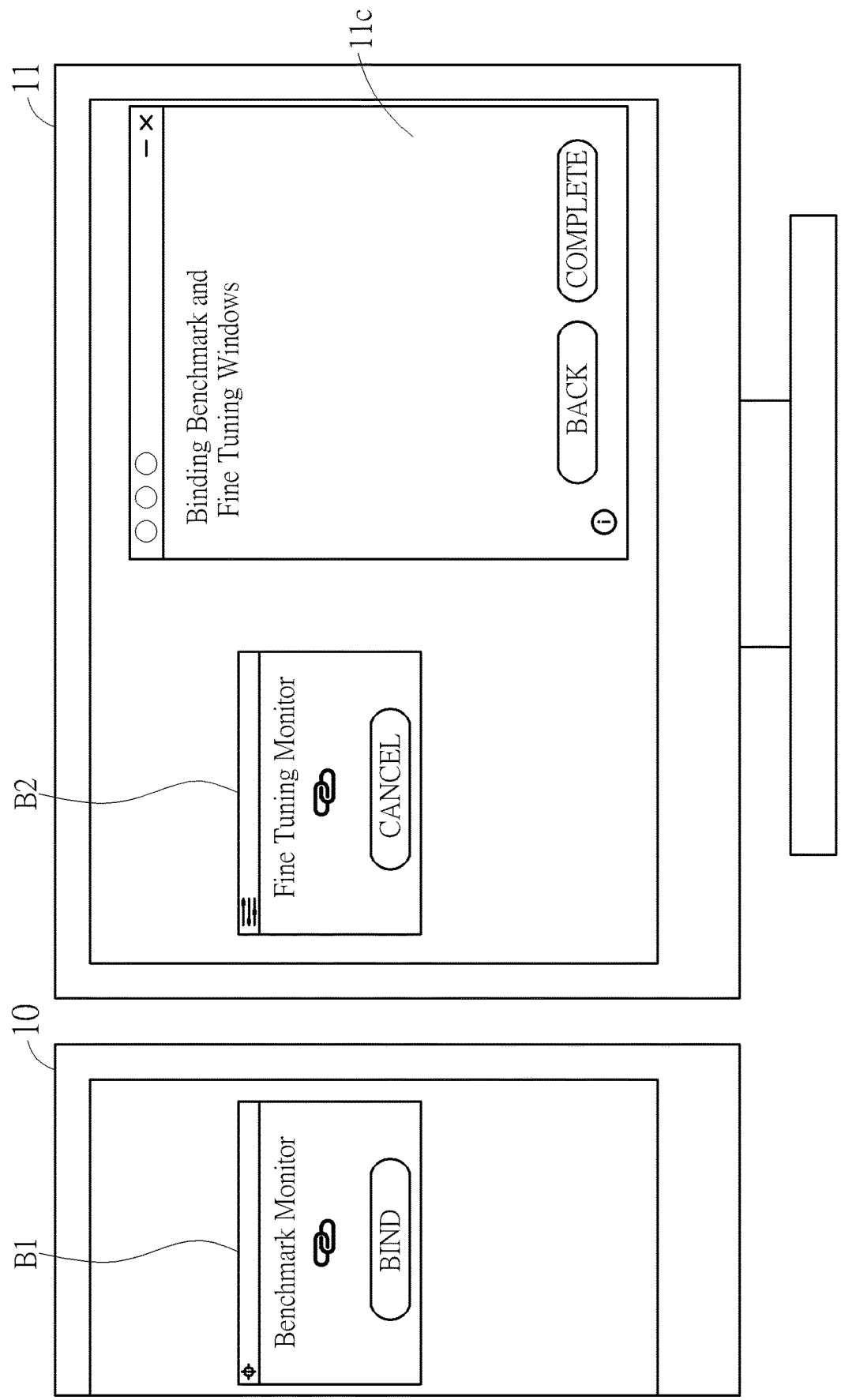
FIG. 7A is an illustration of binding dual screens under a general mode of the display parameter adjustment system in FIG. 1.
Figure 7B:
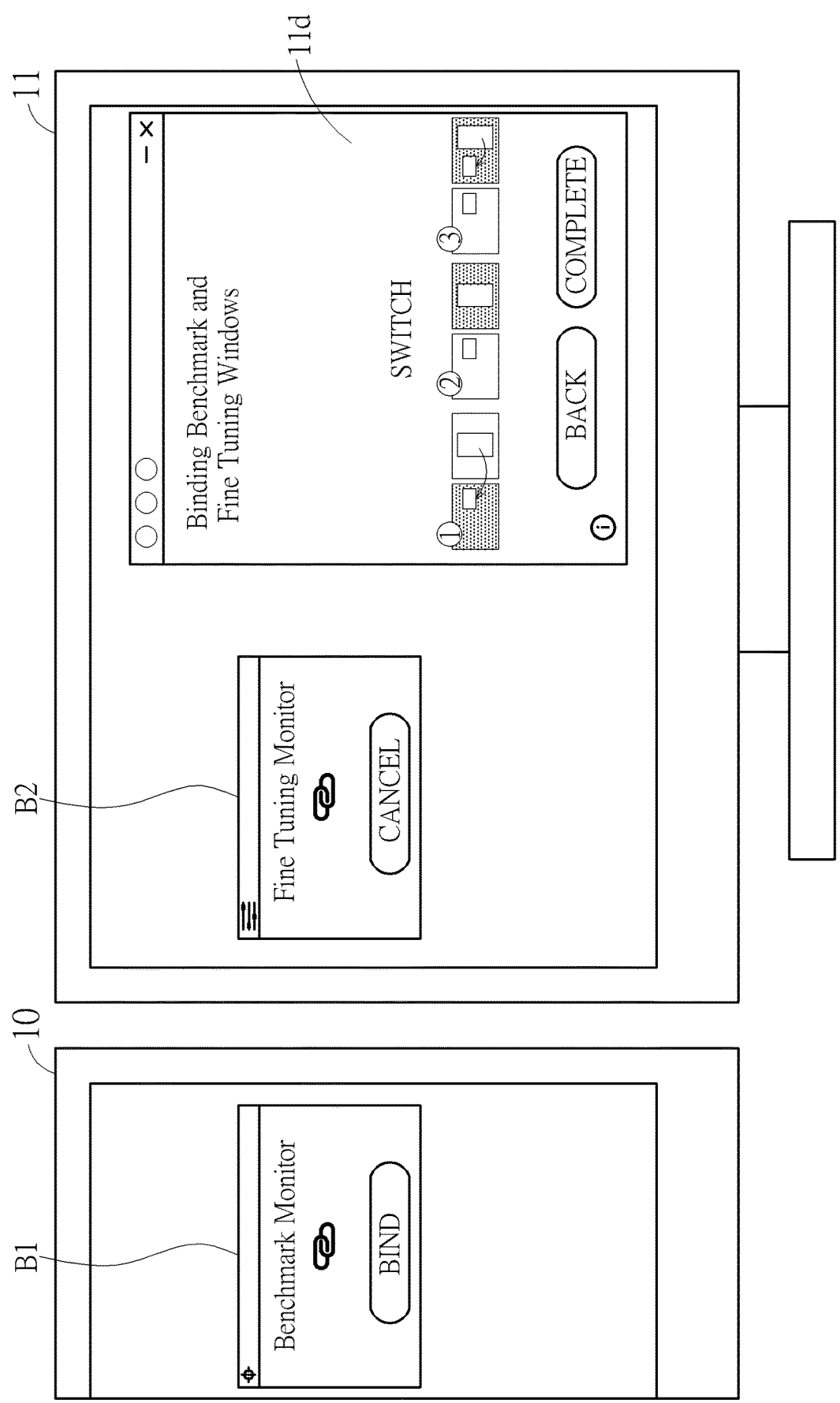
FIG. 7B is an illustration of binding dual screens under a user operation assistance mode of the display parameter adjustment system in FIG. 1.

Details of binding the first display 10 and the second display 11 of the display parameter adjustment system 100 are illustrated below. Here, the first display 10 can be set as the reference display (i.e., a benchmark monitor). The second display 11 can be set as the adjustment display (i.e. a fine-tuning monitor). FIG. 7A is an illustration of binding dual screens under a general mode of the display parameter adjustment system 100. FIG. 7B is an illustration of binding the dual screens under a user operation assistance mode of the display parameter adjustment system 100. In FIG. 7A, the display parameter adjustment system 100 can generate a binding adjustment window 11c. The binding adjustment window 11c can include a start binding button. After a binding program is started through the binding adjustment window 11c, the display parameter adjustment system 100 can further generate a first binding window B1 and a second binding window B2. The first binding window B1 corresponds to the reference display. The second binding window B2 corresponds to the adjustment display. The first binding window B1 can be dragged to a first screen of the first display 10. Therefore, a first binding state of the first display 10 by using the first binding window B1 can be determined. The second binding window B2 can be dragged to a second screen of the second display 11. Therefore, a second binding state of the second display 11 by using the second binding window B2 can be determined. After the start binding button is triggered, the binding program of the dual screens is performed. However, some operating systems cannot directly identify correlations between the two screens selected by the user due to system-terminal hardware limitations. Therefore, the user operation assistance mode can be introduced to the display parameter adjustment system 100. As shown in FIG. 7B, the display parameter adjustment system 100 can generate a binding state determination window 11d when the controllability of first display 10 or the second display 11 is unidentified. The binding state determination window 11d can include a binding key. When the binding key is triggered, the display parameter adjustment system 100 can execute a binding state determination program for generating the first binding window B1 again. Then, the display parameter adjustment system 100 can control the first display 10 to display a first flickering image. Particularly, the display parameter adjustment system 100 does not limit to setting a particular flickering frequency or cycle of the first flickering image displayed on the first display 10. For example, the first flickering image of the first display 10 can flash three times in succession. The flickering cycle (i.e., the time duration from a brightness state to a darkness state) can be 0.5 seconds. After flashing three times in succession, the first display 10 can be idle for 5 seconds and then enter a next flickering cycle. Further, the display parameter adjustment system 100 does not limit to using the flickering effect for indicating the controllability of different screens. For example, in the binding state determination program of the display parameter adjustment system 100, different colors or different brightness values can be used for indicating the controllability of different screens. Any reasonable technology falls into the scope of the present invention. Then, after the first flickering image is displayed on the first display 10, it implies that the first display 10 can be identified. Therefore, the first binding window can be dragged to the first screen of the first display 10 for determining that the first display 10 is bound and controlled. Then, a switch button of the binding state determination window 11d can be used for switching the display parameter adjustment system 100 to control the second display 11. Then, the display parameter adjustment system 100 can flash the switch button of the binding state determination window 11d. When the switch button is flickering and triggered, the display parameter adjustment system 100 can control the second display 11 to display a second flickering image. The display parameter adjustment system 100 can generate the second binding window B2 again. Similarly, the display parameter adjustment system 100 does not limit a specific flicking frequency or a specific flicking cycle of the second flickering image displayed on the second display 11. Further, the display parameter adjustment system 100 can also prompt a user to press the switching button. For example, the display parameter adjustment system 100 can flash the switching button. If the user presses the switching button, the display parameter adjustment system 100 can control the second display 11 to flash its screen. If the switch button is not triggered, the switch button will continue to flash. Similarly, after the second flickering image is displayed on the second display 11, the second binding window B2 can be dragged to the second screen of the second display 11 for determining that the second display 11 is bound and controlled.

Further, in the binding state determination program, if an error occurs, the display parameter adjustment system 100 can generate a warning message. For example, when the user repeatedly binds the same screen (i.e., binds the screen that has already been bound), an error will occur. For example, when a non-flash screen is bound, an error will occur. After the warning message is generated, the display parameter adjustment system 100 can unbind all programs for initializing the first display 10 and the second display 11. Then, the display parameter adjustment system 100 can execute the binding program and the binding state determination program again. In the display parameter adjustment system 100, after the binding state determination program is completed, a confirmation key (i.e., such as a "NEXT" key) can be used for entering subsequent image processing programs.

Figure 8:
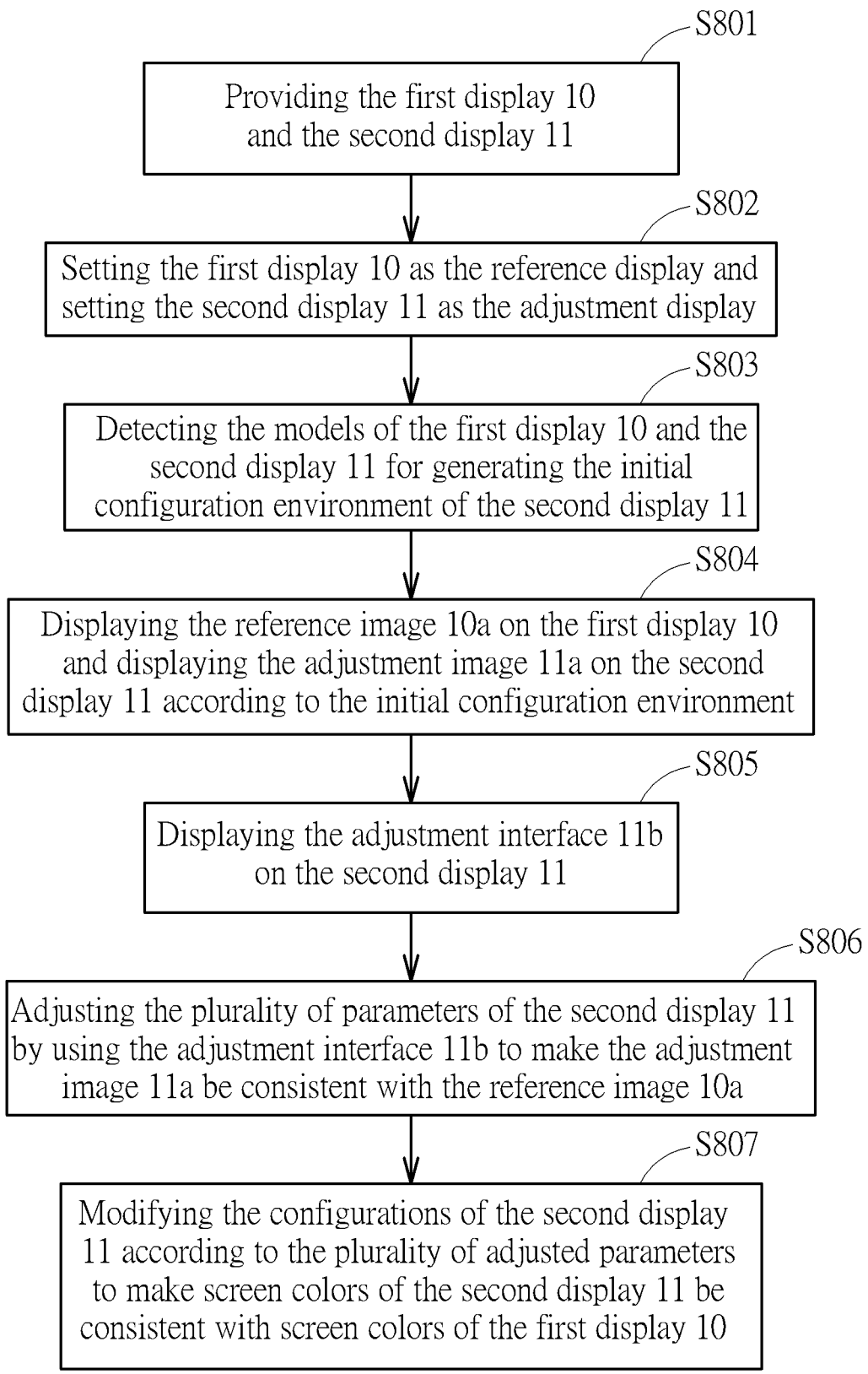
FIG. 8 is a flow chart of performing a display parameter adjustment method by the display parameter adjustment system in FIG. 1.

FIG. 8 is a flow chart of performing a display parameter adjustment method by the display parameter adjustment system 100. The display parameter adjustment method includes step S801 to step S807. Any reasonable technology modification falls into the scope of the present invention. Step S801 to step S807 are illustrated below.

- step S801: providing the first display 10 and the second display 11;
- step S802: setting the first display 10 as the reference display and setting the second display 11 as the adjustment display;
- step S803: detecting the models of the first display 10 and the second display 11 for generating the initial configuration environment of the second display 11;
- step S804: displaying the reference image 10a on the first display 10 and displaying the adjustment image 11a on the second display 11 according to the initial configuration environment;
- step S805: displaying the adjustment interface 11b on the second display 11;
- step S806: adjusting the plurality of parameters of the second display 11 by using the adjustment interface 11b to make the adjustment image 11a be consistent with the reference image 10a;
- step S807: modifying the configurations of the second display 11 according to the plurality of adjusted parameters to make screen colors of the second display 11 be consistent with screen colors of the first display 10.

Details of step S801 to step S807 are previously illustrated. Thus, they are omitted here. Since the display parameter adjustment system 100 can use the software program for generating an intuitive interface for adjusting images displayed on dual screens, the operation efficiency of adjusting color tones of two displays can be improved. Therefore, the display parameter adjustment system can provide intuitive and convenient color adjustment operations.

To sum up, the present invention discloses a display parameter adjustment method and a display parameter adjustment system. The display parameter adjustment system can be used for adjusting color tones of at least two screens. Particularly, the display parameter adjustment system can generate an intuitive adjustment interface for adjusting various parameters of images displayed on the at least two screens. Therefore, the display parameter adjustment system can provide the following advantages. First, the display parameter adjustment system can adjust major parameters of the color adjustment process through an intuitive adjustment interface. Second, the display parameter adjustment system can introduce weightings (gains) of the color tones to the color adjustment process for providing high hardware operational efficiency. Third, the display parameter adjustment system can simulate graphic-based image processing operations and determinations for users, leading to high operational efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display parameter adjustment method comprising:
generating a binding adjustment window;
using the binding adjustment window for enabling a binding program to generate a first binding window and a second binding window;
dragging the first binding window to a first screen of a first display;
determining a first binding state of the first display by using the first binding window;
dragging the second binding window to a second screen of the second display;
determining a second binding state of the second display by using the second binding window;
setting the first display as a reference display and setting the second display as an adjustment display;
detecting models of the first display and the second display for generating an initial configuration environment of the second display;
displaying a reference image on the first display and displaying an adjustment image on the second display according to the initial configuration environment;
displaying an adjustment interface on the second display;

adjusting a plurality of parameters of the second display by using the adjustment interface to make the adjustment image be consistent with the reference image; and
modifying configurations of the second display according to a plurality of adjusted parameters to make screen colors of the second display be consistent with screen colors of the first display.

2. The method of claim 1, wherein detecting the models of the first display and the second display for generating the initial configuration environment of the second display comprises:
generating the initial configuration environment of the second display by setting a color mode of the second display as a user-defined mode and setting a plurality of color tone parameters of the second display according to configurations of the first display when the models of the first display and the second display are identical.

3. The method of claim 1, wherein detecting the models of the first display and the second display for generating the initial configuration environment of the second display comprises:
generating the initial configuration environment of the second display by setting a color mode of the second display as a user-defined mode, setting a part of color tone parameters of the second display according to configurations of the first display, and optimizing another part of color tone parameters of the second display within an adjustable range according to configurations of the first display when the models of the first display and the second display are different.

4. The method of claim 1, further comprising:
binding the first display and the second display before displaying the reference image on the first display and displaying the adjustment image on the second display according to the initial configuration environment.

5. The method of claim 1, wherein adjusting the plurality of parameters by using the adjustment interface to make the adjustment image be consistent with the reference image comprises:
performing a white point adjustment program to make brightness and color temperatures of the adjusted image be consistent with the reference image.

6. The method of claim 5, wherein the color temperatures of the adjusted image comprise a red color temperature, a green color temperature, and a blue color temperature.

7. The method of claim 1, wherein adjusting the plurality of parameters by using the adjustment interface to make the adjustment image be consistent with the reference image comprises:
performing a color adjustment program to make a hue value and a saturation value of the adjustment image be consistent with the reference image.

8. The method of claim 7, wherein performing the color adjustment program to make the hue value and the saturation value of the adjustment image be consistent with the reference image comprises calibrating configurations of a color wheel, and the color wheel comprises a red color, a yellow color, a green color, a cyan color, a blue color, and a purple color.

9. The method of claim 1, wherein adjusting the plurality of parameters by using the adjustment interface to make the adjustment image be consistent with the reference image comprises:
performing an adjustment result determination program for comparing color differences between the adjustment image and the reference image.

10. The method of claim 1, further comprising:
generating a binding state determination window when controllability of the first display or the second display is unidentified;
using the binding state determination window for enabling a binding state determination program to generate the first binding window again; and
dragging the first binding window to the first screen of the first display for determining that the first display is bound and controlled.

11. The method of claim 1, further comprising:
generating a binding state determination window when controllability of the first display or the second display is unidentified;
using the binding state determination window for enabling a binding state determination program to generate the first binding window again;
controlling the first display to display a first flickering image; and
dragging the first binding window to the first screen of the first display for determining that the first display is bound and controlled after the first flickering image is displayed on the first display.

12. The method of claim 11, further comprising:
flickering a switch button of the binding state determination window;
controlling the second display to display a second flickering image when the switch button is flickering and triggered;
generating the second binding window again; and
dragging the second binding window to the second screen of the second display for determining that the second display is bound and controlled after the second flickering image is displayed on the second display.

13. The method of claim 12, further comprising:
generating a warning message if an error occurs in the binding state determination program;
unbinding all programs for initializing the first display and the second display after the warning message is generated; and
executing the binding program and the binding state determination program again.

14. A display parameter adjustment system comprising:
a first display configured to display a reference image;
a second display configured to display an adjustment image; and
a processor coupled to the first display and the second display and configured to control the first display and the second display;
wherein the processor generates a binding adjustment window, uses the binding adjustment window for enabling a binding program to generate a first binding window and a second binding window, determines a first binding state of the first display after the first binding window is dragged to a first screen of the first display, determines a second binding state of the second display after the second binding window is dragged to a second screen of the second display, sets the first display as a reference display and sets the second display as an adjustment display, the processor detects models of the first display and the second display for generating an initial configuration environment of the second display, the processor controls the first display for displaying the reference image and controls the second display for displaying the adjustment image according to the initial configuration environment, the processor controls the second display for displaying an adjustment interface, the processor adjusts a plurality of parameters of the second display by using the adjustment interface to make the adjustment image be consistent with the reference image, and the processor modifies configurations of the second display according to a plurality of adjusted parameters to make screen colors of the second display be consistent with screen colors of the first display.

15. The system of claim 14, wherein the processor generates the initial configuration environment of the second display by setting a color mode of the second display as a user-defined mode and setting a plurality of color tone parameters of the second display according to configurations of the first display when the models of the first display and the second display are identical.

16. The system of claim 14, wherein the processor generates the initial configuration environment of the second display by setting a color mode of the second display as a user-defined mode, setting a part of color tone parameters of the second display according to configurations of the first display, and optimizing another part of color tone parameters of the second display within an adjustable range according to configurations of the first display when the models of the first display and the second display are different.

17. The system of claim 14, wherein the processor perform a white point adjustment program to make brightness and color temperatures of the adjusted image be consistent with the reference image.

18. The system of claim 14, wherein the processor performs a color adjustment program to make a hue value and a saturation value of the adjustment image be consistent with the reference image.

19. The system of claim 14, wherein the processor performs an adjustment result state determination program for comparing color differences between the adjustment image and the reference image.

* * * * *